(12) United States Patent
Van Horne

(10) Patent No.: US 6,957,169 B1
(45) Date of Patent: Oct. 18, 2005

(54) METHOD AND APPARATUS FOR OPTIMIZING DATA CONNECTION PERFORMANCE

(75) Inventor: Peter Van Horne, San Diego, CA (US)

(73) Assignee: Cisco Technology, Inc., San Jose, CA (US)

(*) Notice: Subject to any disclaimer, the term of this patent is extended or adjusted under 35 U.S.C. 154(b) by 82 days.

(21) Appl. No.: 10/093,863

(22) Filed: Mar. 7, 2002

(51) Int. Cl.$^7$ .......................... G06F 11/30; G21C 17/00
(52) U.S. Cl. ...................................................... 702/182
(58) Field of Search .................... 702/69, 182, 183, 702/189–191, 60–62; 455/63.1, 67.13, 226.1, 226.2, 226.3, 500, 501, 522–526

(56) References Cited

U.S. PATENT DOCUMENTS

| | | | | |
|---|---|---|---|---|
| 6,205,220 B1 | * | 3/2001 | Jacobsen et al. | 379/417 |
| 6,229,855 B1 | * | 5/2001 | Takatori et al. | 375/296 |
| 6,236,865 B1 | * | 5/2001 | Lu | 455/522 |
| 6,549,520 B1 | * | 4/2003 | Gross et al. | 370/242 |
| 6,697,487 B1 | * | 2/2004 | Getchell | 379/417 |

OTHER PUBLICATIONS

Wei Yu et al., "An Adaptive Power Control Algorithm for VDSL", IEEE Globecom, 2001.

Frank Sjoberg et al., "Power Back–Off for Multiple Target Bit Rates", E1E1.4 VDSL, Plano, Texas, Nov. 30–Dec. 4, 1998, pp. 1–8.

Frank Sjoberg et al., "Power back–off for multiple target bit rates", T1E1.4/98–371 Plano, Texas, Nov. 30–Dec. 4, 1998, pp. 1–8.

Wei Yu et al., "An adaptive multiuser power control algorithm for VDSL", GLOBECOM 2001–IEEE Global Telecommunications Conference, No. 1, Nov. 2001, pp. 394–398.

* cited by examiner

*Primary Examiner*—Michael Nghiem
(74) *Attorney, Agent, or Firm*—Thelen Reid & Priest, LLP; Thierry K. Lo

(57) ABSTRACT

A method optimizes the performance of multiple communication links in a data telecommunication system that has two or more remote units and a central unit. Each remote is coupled to the central unit through a communication link. A Signal to Noise Ratio (SNR) value is measured for each communication link at the central unit. The transmission power level of the remote unit with the highest SNR value is adjusted to reduce interference between adjacent communication links. The transmission power level of all remote units is then increased to overcome noise in the communication links.

50 Claims, 5 Drawing Sheets

METHOD AND APPARATUS FOR OPTIMIZING DATA CONNECTION PERFORMANCE

FIELD OF THE INVENTION

The present invention relates to communication systems. More particularly, the present invention relates to telecommunication systems with adjacent communication links.

BACKGROUND OF THE INVENTION

High speed data connections that operate over wiring where other active connections are also operating in adjacent wiring may introduce interference, also known as cross-talk interference, into the adjacent wiring. This cross-talk interference can impact the quality of connections existing over the adjacent wiring reducing the distance over which the connection can operate and/or increasing the incidence of data errors over such connections.

FIG. 1 illustrates a conventional telecommunication system. Remote network elements 102 communicate with a central network element 104, such as a hub, switch, router or access multiplexer, over wired communications links 106 of varying lengths. A remote network element 102 may be a modem, a network interface device, a digital subscriber line (DSL), a router, and the like. Communication links 106 are subject to cross-talk interference from signals active over adjacent communication links coupled from remote network elements 102 to central network element 104. Other sources of noise or interference include transient signals resulting from electromagnetic signals created by other devices including motors, lights, radios, or other devices. Noise and interfering signals from a variety of sources combine to produce complex signals at each end of the communications links, at remote network elements 102 and central network element 104. These complex signals combine with the desired signals transmitted over communications links 106. The remote and central network elements 102 and 104 must be able to recover the desired signal in the presence of this interference. In addition, the strength of the desired signals and the interfering signals is affected by the attenuation of communications links 106. The amount of coupling between the communications links 106 also depends on parameters including the length, the degree of adjacency (closeness) over variable distances and the electrical characteristics of the communications links.106.

A variety of methods have been proposed for minimizing the level of interference in adjacent wiring. An example of such methods is a known power back-off technique used to control the uplink power level in DSL transmissions. Such power back-off techniques attempt to select an appropriate power level for the remote terminal transmitter power. Algorithms used to implement such techniques typically attempt to characterize the quality of the connection based on an analysis of the signal level received from the central network element equipment located at the origin of the connection.

For example, a central network element supporting more than one data connection, for example 10 connections, may use the power back-off algorithm to minimize the level of interference. Each of the 10 remote terminal devices will analyze the power level received from the central network element independently and will select a transmission power level. Because of differences in attenuation at different frequencies (for example, the transmission from the remote terminal device to the central network element may be at a different frequency) the remote terminal devices will in some instances select a transmission power level that is sub-optimal in reference to the ideal power level that would maximize the performance of all data connections to the central network element.

The sub-optimal results could include reduced signal quality on adjacent data connections due to some remote terminal devices transmitting at greater power levels than required. Another result could include remote terminals transmitting with a lower power level than the level that would maximize reliability of all data connections to the central network element device.

Algorithms that operate in the manner described above do not select optimal power levels for data connections that are operating in the middle of the dynamic range of the connection. These algorithms tend to select transmit power levels that are too low to optimize the performance over the data connections operating in the middle of the service range for the selected connection method by selecting the minimum required power to establish the connection. In addition, the independent calculation of power levels by each remote terminal may create a sub-optimal balance of signal levels at the central network element. Furthermore, the introduction of additional loss onto the data connection, particularly loss that is dependent on frequency, may cause the remote terminal to select power levels that further impact the performance of adjacent connections.

A need therefore exists for a method for optimizing the performance of a collection of multiple adjacent data connections by cooperatively selecting transmission power levels to meet specified performance criteria. In particular, the method should allow data connections operating on adjacent wiring connections to select mutually optimal transmitter power levels, therefore improving the performance of the overall communications system.

BRIEF DESCRIPTION OF THE INVENTION

A method optimizes the performance of multiple communication links in a data telecommunication system that has two or more remote units and a central unit. Each remote unit is coupled to the central unit through a communication link. A Signal to Noise Ratio (SNR) value is measured for each communication link at the central unit. The transmission power level of the remote unit with the highest SNR value is adjusted to reduce interference between adjacent communication links. The transmission power level of all remote is then increased to overcome noise in the communication links at each remote unit.

BRIEF DESCRIPTION OF THE DRAWINGS

The accompanying drawings, which are incorporated into and constitute a part of this specification, illustrate one or more embodiments of the present invention and, together with the detailed description, serve to explain the principles and implementations of the invention.

In the drawings.

DETAILED DESCRIPTION

Embodiments of the present invention are described herein in the context of a method and apparatus for optimizing data connection performance in a communication system. Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will now be made in detail to implementations of the present invention as illustrated in the accompanying drawings. The same reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

In accordance with the present invention, the components, process steps, and/or data structures may be implemented using various types of operating systems, computing platforms, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein.

Figure 1:
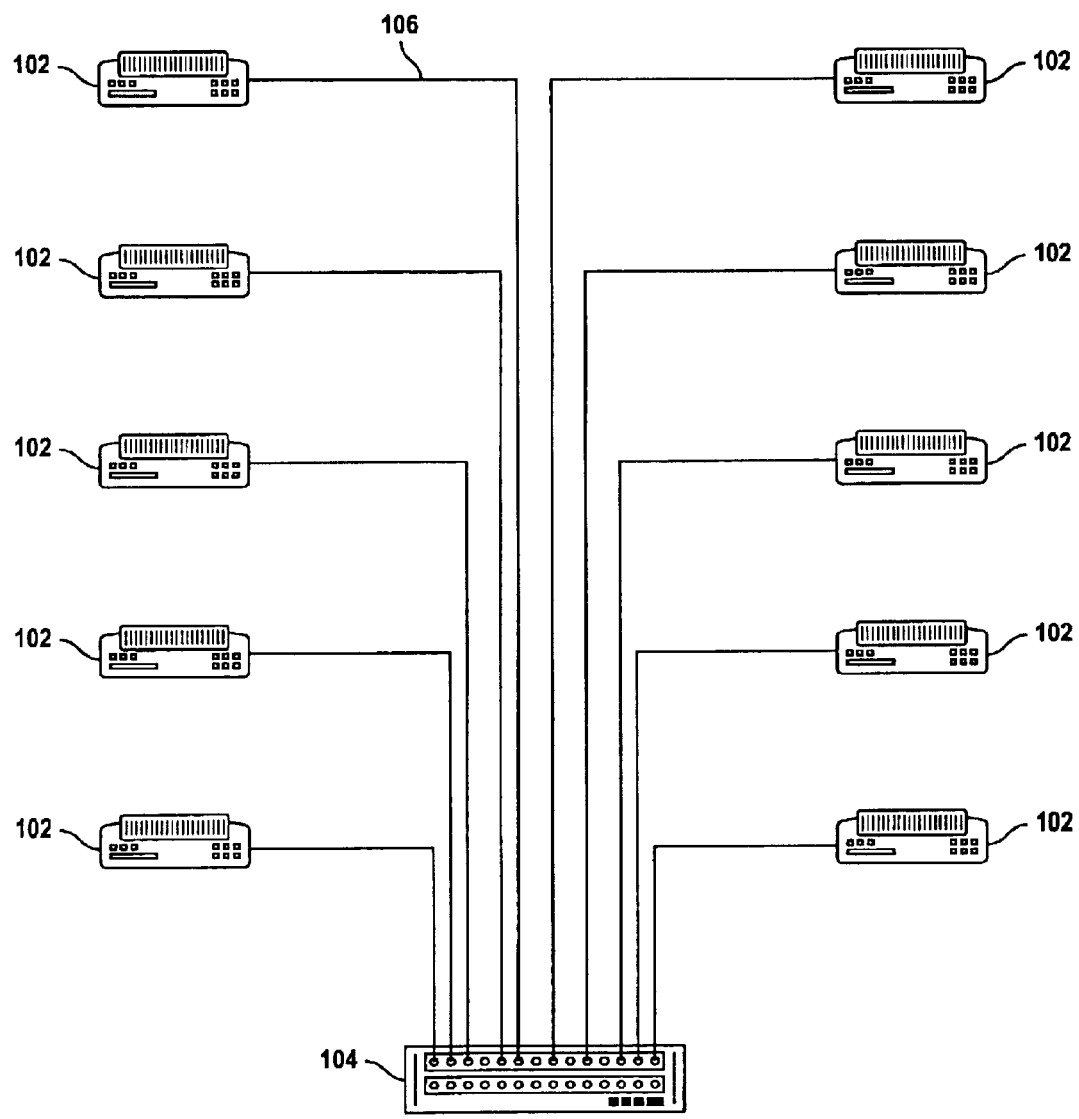
FIG. 1 is a schematic diagram illustrating a typical star topology data telecommunications network.
Figure 2:
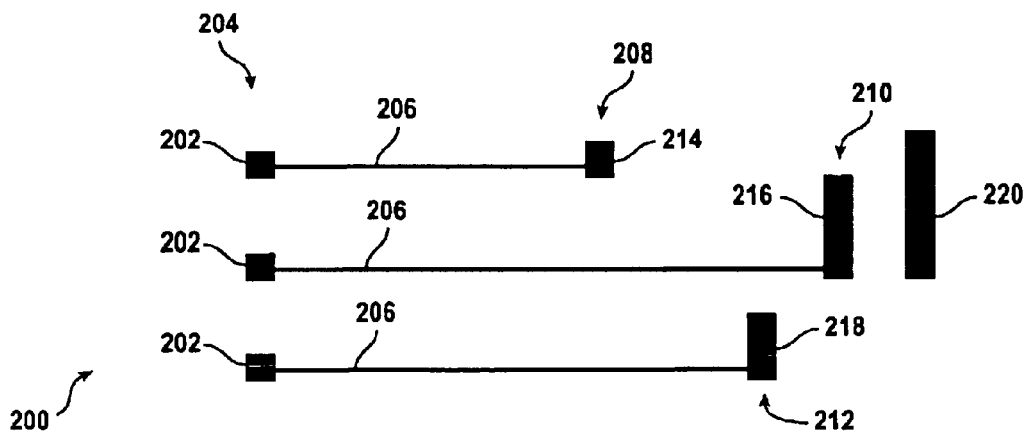
FIG. 2 is a schematic diagram illustrating signals transmitted from remote network elements and received at a central network element under ideal conditions.

FIG. 2 is a schematic diagram illustrating signals transmitted from remote network elements 208, 210, and 212 and received at a central network element 204 under ideal conditions. Under ideal conditions, the received power signal levels 202 at the central network element 204 will be identical and there will be no interference or noise on the communication links 206. Each remote network element 208, 210, and 212 selects a transmission power level respectively 214, 216, and 218 from a maximum available power 220 such that the received power signal levels 202 at the central network element 204 will be identical. Under these conditions, each link has the greatest probability of loss-free communications. Selection of the ideal power levels 214, 216, and 218 is discussed in more detail below. The links may be any conventional communications media, e.g., wires, Ethernet, electromagnetic radiation (IR, radio, microwave, and other appropriate frequencies) and the like.

Figure 3:
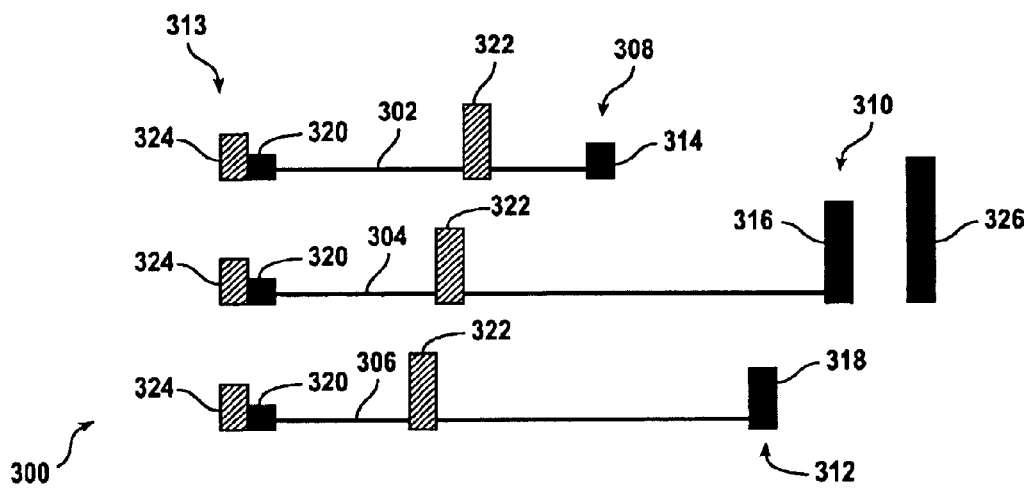
FIG. 3 is a schematic diagram illustrating signals transmitted from remote network elements using power back-off techniques and received at a central network element along with their corresponding noise.

FIG. 3 is a schematic diagram illustrating signals transmitted from remote network elements 308, 310, and 312 using power back-off techniques and received at a central network element 313 along with their respective noise. FIG. 3 illustrates the effects of interference on the performance of the data telecommunications system 300. Communications links 302, 304, and 306 have different lengths, different attenuation, and different levels of coupling between them. Each remote network element 308, 310, and 312 selects a transmission level respectively 314, 316, and 318 using an algorithm. Many communications systems select the power levels based on measurements performed on each individual communications link by each remote network element. The selection of transmission power is based on algorithms of several types. One algorithm, for example a power-back off algorithm, sets the transmission power based on the measurement of signal levels by each remote network element operating independently of other remote network elements using measured received signal levels from the other end of the communications link, at a central network element 313. Based on this algorithm, signal levels 314, 316, and 318 are selected to produce a particular signal level 320 at the central network element 313. Each communications link is also subject to a noise signal 322 resulting in a received noise signal level 324 at the central network unit 313. Because the level of the received noise signal level 324 in FIG. 3 is higher than the level of the desired signal 320, errors are likely to occur on the communications links 302, 304, and 306. The remote network elements 308, 310, and 312 could have selected transmission levels up the maximum level 326. If maximum signal level 326 had been selected, the received signals 320 at the other end of the communications link 302, 304, and 306 would be stronger than the received noise signal level 324, increasing the probability of loss-free communications. On the other hand, higher power levels tend to induce greater cross-talk interference on adjacent communications links.

Figure 4:
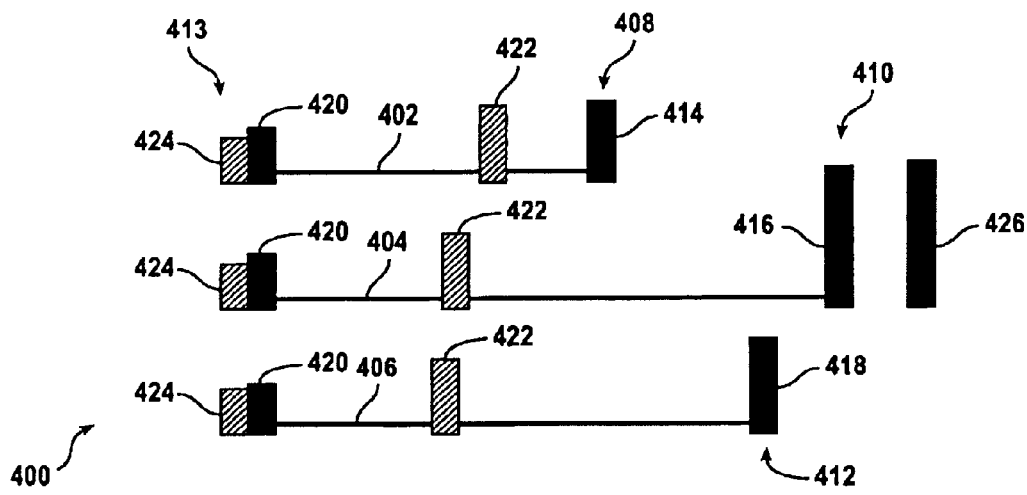
FIG. 4 is a schematic diagram illustrating adjusted signals transmitted from remote network elements and received at a central network element along with their corresponding noise.

FIG. 4 is a schematic diagram illustrating adjusted signals transmitted from remote network elements 408, 410, and 412 and received at a central network element along with their corresponding noise. FIG. 4 illustrates a data telecommunications system 400 where higher power levels for remote network elements are selected. Communications links 402, 404, and 406 are respectively coupled to remote network elements 408, 410, and 412 and a central network element 413. Each remote network element 408, 410, and 412 selects adjusted signal levels 414, 416, and 418 respectively resulting in received signals level 420 at the central network element 413. Adjusted signal levels 414, 416, and 418 can be adjusted to a maximum signal level 426. The received signals level 420 have about the same level. The noise signal 422 produces a received noise signal level 424 at the central network element 413. The adjusted signal levels 414, 416, and 418 are able to overcome the interfering signal level 424 and produce desired signals level 420 that are greater than the received noise signal level 424 at the central network element 413. The algorithm used by the remote network elements 408, 410, and 412 adjusts the power on their individual links based on the level of noise. This is an improved algorithm, however the power levels between communication links are not optimized, increasing the level of cross-talk interference generated by adjacent communication links 402,404, and 406. This problem is described in more detail in FIG. 5.

Figure 5:
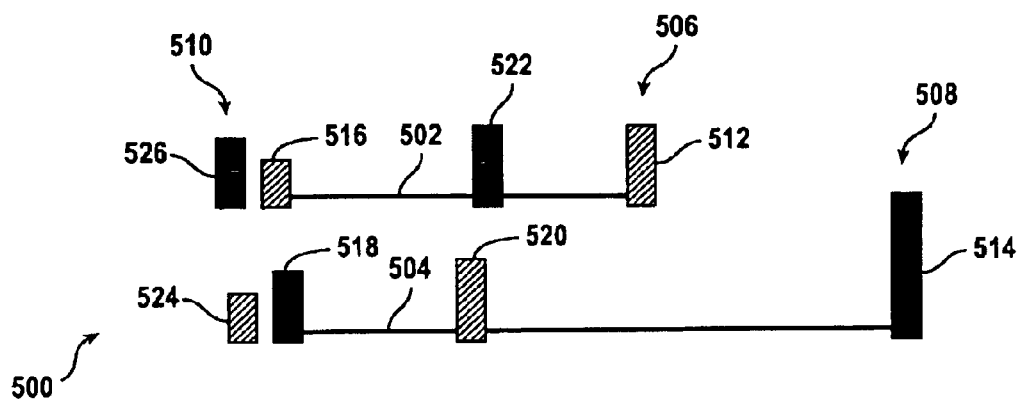
FIG. 5 is a schematic diagram illustrating signals transmitted from remote network elements and received at a central network element along with their corresponding cross-talk interference.

FIG. 5 is a schematic diagram illustrating signals transmitted from remote network elements 506, 508 and received at a central network element 510 along with their respective cross-talk interference. A data telecommunications system 500 has communications links 502 and 504 coupling remote network elements 506 and 508 respectively to a central network element 510. Remote network elements 506 and 508 select power signals levels 512 and 514 respectively. The power signals of remote network elements 506 and 508 are transmitted on communications links 502 and 504 respectively resulting in received signal levels 516 and 518 respectively at the central network element 510. Because the communications links 502 and 504 are adjacent to each other, the signal 512 of remote network element 506 creates a cross-talk interference signal level 520 on communications link 504. In a similar fashion, the signal 514 of remote network element 508 creates a cross-talk interference signal level 522 on communications link 502. The cross-talk interference signal level 520 produces a received cross-talk interference signal level 524 at the central network element 510. The cross-talk interference signal level 522 produces a received cross-talk interference signal level 526 at the central network element 510. The received cross-talk interference signal level 526 is greater than the received signal level 516 at the central network element 510 and thus interferes with the received signal level 516 resulting in potential data loss on communication link 502. On communications link 504, the received signal level 518 is greater than the received cross-talk interference signal level 524 at the central network element 510 and thus the communications on link 504 has an increased probability for error-free communications.

The remote network element on communications link 504 transmitted at a greater power level than required and as a result created a greater cross-talk interfering signal on communications link 502, and thus a greater received cross-talk interference signal 526 at the central network element 510. Because remote network element 508 used more power than required on communications link 504, communications link 502 has unreliable communications. The lack of coordination of transmission levels between communications links 502 and 504 produces a sub-optimal result for communication system 500.

Figure 6:
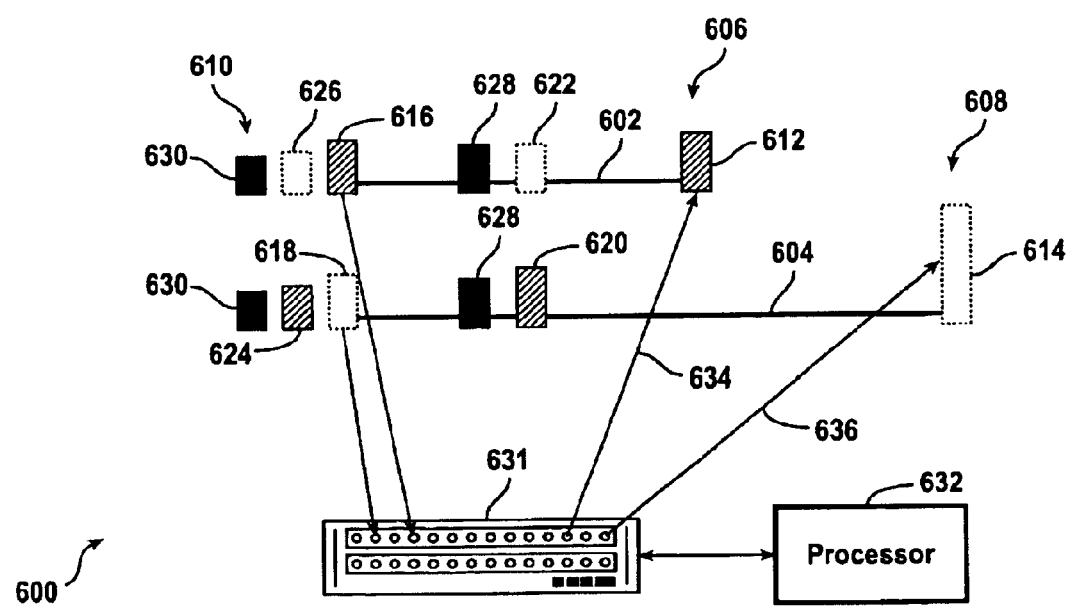
FIG. 6 is a schematic diagram of a data telecommunications system for adjusting signal levels transmitted from remote network elements to a central network element in accordance with one embodiment of the present invention.

FIG. 6 is a schematic diagram illustrating a data telecommunications system including the capability of adjusting signal levels transmitted from remote network elements 606, 608 to a central network element 610 in accordance with one embodiment of the present invention. A data telecommunications system 600 has communications links 602 and 604 operating simultaneously. Communications links 602 and 604 couple remote network elements 606 and 608 respectively to a central network element 610. Remote network elements 606 and 608 transmit at power signals levels 612 and 614 respectively. The power signals of remote network elements 606 and 608 are transmitted on communications links. 602 and 604 respectively resulting in received signal levels 616 and 618 respectively at the central network element 610.

Because communications links 602 and 604 are adjacent to each other, power signal level 612 of remote network element 606 creates a cross-talk interference signal level 620 on communications link 604. In a similar fashion, power signal level 614 of remote network element 608 creates a cross-talk interference signal level 622 on communications link 602. The cross-talk interference signal level 620 produces a received cross-talk interference signal level 624 on communications link 604 at the central network element 610. The cross-talk interference signal level 622 produces a received cross-talk interference signal level 626 on communications link 602 at the central network element 610. Each communications link is also subject to the same noise signal level 628 resulting in a received noise signal level 630 at the central network element 610.

The received signal level 616 is greater than the received cross-talk interference signal level 626 and the received noise signal level 630 at the central network element 610 and thus the communications on link 602 is essentially error-free. In a similar fashion, the received signal level 618 is greater than the received cross-talk interference signal level 624 and the received noise signal level 630 at the central network element 610 and thus the communications on link 604 is essentially error-free.

Remote network elements 606 and 608 cooperate in order to select the optimum transmission signal levels 612 and 614 respectively, to overcome cross-talk interference and noise interference balanced with the need to enable all communications links to deliver the lowest possible error performance. In accordance with one embodiment, a monitor 631 measures the strength and quality of the received signal 616 and 618 on each communications link 602 and 604 respectively. A processor 632 is coupled to the monitor 631. In accordance with another embodiment, processor 632 may reside in the monitor 631. In accordance with yet another embodiment, processor 632 may reside in a system separately from the monitor 631. Processor 632 measures signal levels measured by monitor 631 and sends commands to remote network elements 606 and 608 to adjust their respective power levels as shown by arrows 634 and 636 in FIG. 6.

The transmitted power levels 612 and 614 on communications links 602 and 604 respectively are adjusted in order to meet the objectives of the algorithm. In accordance with one embodiment, the algorithm may cause transmission of the minimum signal levels required in order to produce equal quality received signals at the central network element 610. If this objective is selected, the resulting network consisting of multiple cooperating network elements will converge on power settings that will optimize the length over which communications links 602 and 604 can operate with minimum errors. According to another embodiment, the algorithm may cause each network element to select the maximum transmission levels consistent with allowing all network elements to operate at specified minimum quality levels. One result of this algorithm may include maximizing the immunity of each communications link to random noise that may impact one or more communication links. In this case there is no need to maximize the possible distance because the algorithm causes the network to trade-off maximum distance for improved noise immunity.

In accordance with another embodiment, the algorithms may also be selected for other objectives. One application of the algorithm involves cooperation amongst multiple remote elements in a network to optimize the performance of the combined group of network elements in the presence of multiple interference, attenuation, coupling, distance, and other variables.

Figure 7:
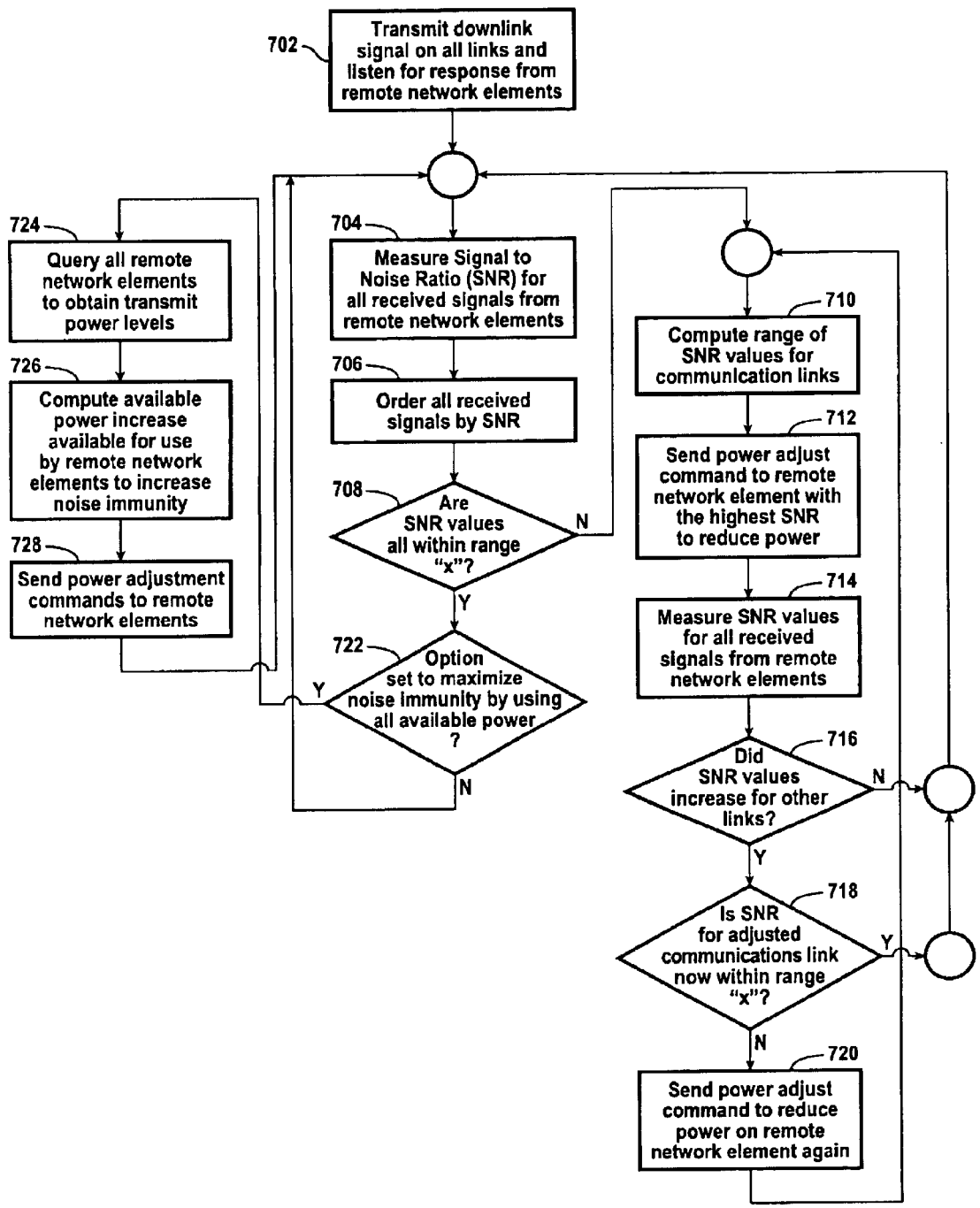
FIG. 7 is a flow diagram illustrating a method for optimizing the performance of a collection of multiple adjacent data connections at a central network element in accordance with one embodiment of the present invention.

FIG. 7 is a flow diagram illustrating a method for optimizing the performance of a collection of multiple adjacent data connections at a central network element according to one specific embodiment of the present invention. In accordance with one embodiment, the present invention may be used to optimize the performance of a communication system including plural data connections according to specific performance criteria. These performance criteria may include, but are not limited to: maximizing transmission distance for a specified Bit Error Rate (BER), maximizing Signal to Noise Ratio (SNR) margin for multiple data connections based on a maximum required distance and minimum SNR for any connection, and other criteria specific to specific installations.

In accordance with another embodiment, this present invention may be used to monitor the performance of a set of data connections to detect changes in performance induced by failures in central network element or remote network equipment on one connection that could impact the performance of other connections. Automated corrective actions may then be executed by adjusting the power levels of other links to maintain optimal performance according to the established criteria. Each remote network element on initialization may execute a method (e.g. power back-off algorithm) to attempt to select a transmission power level that allows the central network element to connect with a remote terminal device.

The monitor 631 of FIG. 6 may be, for example, a central network element that, either locally using its internal processor or in cooperation with an external processor, analyzes the results of the initial power-on transmit power level selections. In a first block 702, the central network element transmits signals on all communications links to the remote network elements and listens for response from them. In block 704, the central network element measures a set of parameters for received signals from remote network elements. For example, the set of parameters may be the Signal to Noise Ratio (SNR) for all received signals from remote network elements. According to one embodiment, the central network element may accept as input an optional list of data connections that should be established, an optional minimum signal quality for any data connection, a maximum range of signal quality desired across the set of data connections to the central network element, an optional list of data connections to the central network element to be excluded from the optimization process, and an optional identification of a "reference connection" that shall be considered as the worst case connection for purposes of selecting the maximum transmission power level.

In block 706, the central network element orders all received signals by SNR to examine the range of all SNR values. In decision block 708, the central network element examines whether the SNR values are all within a specified range. The specified range may be modified to reflect different objectives. For example, a "small" range would result in closely matched received signal quality at the central network element for a system with multiple communication links with similar characteristics including one or more of the following: distance, attenuation, coupling, and noise. On the other hand, a "large" range would result in faster convergence for a communications system with a large number of data connections with a large range of communications link characteristics including one or more of the following: distance, attenuation, coupling, and noise.

If the SNR values are not within the specified range, the central network element computes again the range of all SNR values for all the communication links in block 710. In block 712, the central network element sends a command to the remote network element with the highest SNR value to adjust its power. According to one embodiment, the central network element sends a command to have the remote network element with the highest SNR value reduce its power level. In block 714, the central network element measures the SNR values for all communication links at the central network element. The adjustment of the power signal of one remote network element affects the cross-talk interference on adjacent communications links, and therefore could affect the SNR values of multiple communications links at the central network element. In decision block 716, if the central network element determines that the new SNR values for the remaining communications links have not increased, the central network element returns to block 704. Otherwise, if the new SNR values for the remaining communications links have increased, the central network element determines whether the new SNR values for the remaining communications links are now within the specified range in block 718. If the new SNR values are now within the specified range, the central network element returns to block 704. Otherwise, the central network element sends another command to the remote network element with the highest SNR value to further adjust its power in block 720. Blocks 710 through 720 allows the central network element to adjust the transmission power levels of selected data connections to converge to an optimal set of transmission power levels across the set of connections to meet the performance criteria as defined above. One embodiment of the method would be to observe the set of received signal levels at the central network element and selectively reduce the power level of the links with the highest received signal quality to the mean of the signal quality across the set of data connections. Data connections with signal quality below the mean would increase their power levels in order to converge with the mean signal quality. After further adjustment, the process loops back to block 710.

Once the SNR values of all communications links are within the specified range in block 708, the central network element determines whether an option to maximize noise immunity has been set in decision block 722. After power levels of the remote network elements are balanced to produce normalized signal quality, the power level of each data connection can be increased by an amount such that the overall balance of signal quality is maintained and the overall signal quality of the set of data connections is increased up to the limit specified by the method. If the option has been set to maximize noise immunity, the process proceeds to block 724 where the central network element queries all remote network elements to obtain their transmission power levels. The central network element then computes the power increase available for use by each remote network element to increase noise immunity in block 726. Based on such computation, the central network element sends power adjustment commands to all the remote network elements in block 728 and the process loops back to block 704. If the option to maximize noise immunity has not been set in block 722, the process loops back to block 704.

The result of this method would be the selection of transmission power levels for each data connection optimized for best performance in relation to the interference generated by adjacent data connections. A secondary result of this method would be a balanced increase in transmitter power levels in adjacent data connections in order to increase the signal quality and noise immunity of the set of data connections.

An additional function of this method could be to monitor the performance of the set of data connections. The method could monitor a number of parameters associated with data connection performance in real time and could perform a set of corrective actions to maximize the overall performance of the set of data connections.

One example of a monitoring function is to monitor data connections for decrease in signal quality. A decrease in signal quality could be produced by a number of causes including failure or degradation of the remote terminal device or central network element receiver, change in the wiring configuration, addition or removal of devices connected to a shared communications link including a phone or other data terminal device, removal of a filter, etc. If the decrease in signal quality occurred on only one data connection, the method could consider leaving the transmitter power at its current level if quality and noise margins are adequate. The method could increase power while monitoring adjacent data channels to determine if there is adverse impact on the performance of adjacent channels. If there is adverse impact, the method could shut down the failed data channel.

A second example could be an unexpected increase in the received signal quality at the central network element. If this increase in signal quality did not result in an unacceptable decrease in adjacent data channel signal quality, the method may take no action. If the increase in signal quality results in unacceptable degradation in adjacent data channels, the method could reduce the transmitter power level of the data channel.

Figure 8:
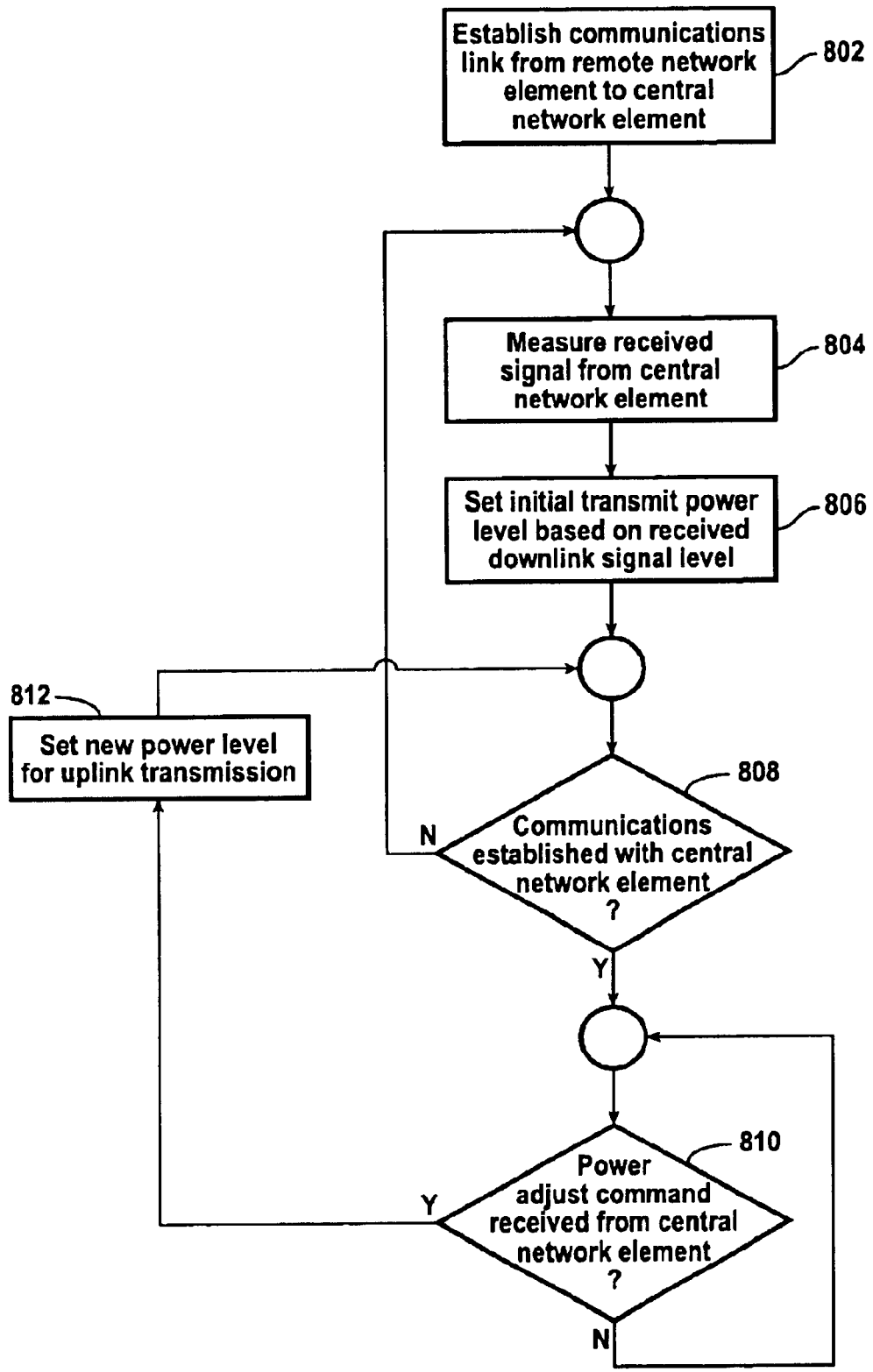
FIG. 8 is a flow diagram illustrating a method for optimizing the performance of a data connection at a remote network element in accordance with one embodiment of the present invention.

FIG. 8 is a flow diagram illustrating a method for optimizing the performance of a data connection at a remote network element according to one specific embodiment of the present invention. In a first block 802, the remote network element establishes a communications link with the central network element. In block 804, the remote network element measures the received signal from the central network element and sets the initial transmit power level based on the received downlink signal level in block 806. The remote network element checks to see if it has established a communication link with the central network element in decision block 808. If no communication link has been established, the process loops back to block 804. Otherwise, if a command to adjust power has been received from the central network element in block 810, the remote network element sets the new power level for uplink transmission in block 812.

The method could also operate cooperatively with other power back-off algorithms. For example, if an event occurred that caused instability in the set of data connections managed by the method, the central network element could revert to a reinitialization sequence to allow the method to repeat its analysis and to re-connect under the new conditions.

In accordance with another embodiment, the method could execute locally in the processor of a central network element. Other embodiments includes the method being executed on a local agent, a master central network element as part of a group, or as an agent program running on a different computer. The method may also be executed over a remote data connection including the Internet.

While embodiments and applications of this invention have been shown and described, it would be apparent to those skilled in the art having the benefit of this disclosure that many more modifications than mentioned above are possible without departing from the inventive concepts herein. The invention, therefore, is not to be restricted except in the spirit of the appended claims.

What is claimed is:

1. A method for optimizing the performance of multiple communication links, comprising:

measuring a received signal quality level for each of a plurality of communication links at a central unit, each of the plurality of communication links coupling the central unit to a respective remote unit;

reducing a transmission power level of the remote unit having the highest received signal quality level among the plurality of remote units; and increasing the transmission power level of the plurality of remote units based on said reducing.

2. The method according to claim 1, wherein said reducing increases the received signal quality levels of remaining remote units of the plurality of remote units, and wherein said increasing maintains a normalized signal quality level for all of the plurality of communication links.

3. The method according to claim 1, further comprising:

converging the received signal quality levels for the plurality of communication links by iteratively repeating said reducing and said increasing.

4. The method according to claim 1, wherein said increasing comprises:

increasing the transmission power level for each remote unit up to a selected maximum transmission power level.

5. The method according to claim 4, further comprising:

computing a power increase available for use by each remote unit.

6. The method according to claim 1, further comprising:

determining, after said reducing, whether a new received signal quality level of each of the remote units is within a specified range.

7. The method according to claim 1, further comprising:

establishing for said reducing and said increasing at least one of:

a minimum signal quality for a data connection;

a maximum range of signal quality across data connections;

a data connection to be exclude from said reducing and said increasing; and a maximum transmission level to which the transmission power level is increased.

8. A method for reducing cross-talk in a communication system, the communication system including a plurality of remote units and a central unit, each remote unit coupled to the central unit through a corresponding communication link, said method comprising:

measuring a Signal to Noise Ratio (SNR) for each of the plurality of communication links;

adjusting a transmission power level of a remote unit having the highest SNR among the plurality of the remote units until the SNR of each communication link falls within a selected range, said adjusting reducing interference among the plurality of communication links; and increasing the transmission power level of each of the plurality of remote units based on said adjusting, said increasing increases noise immunity of the plurality of communication links.

9. The method according to claim 8, wherein said adjusting further comprises:

measuring the SNR for each remote unit after each adjustment.

10. The method according to claim 8, wherein one or more remote units are located at distinct locations.

11. The method according to claim 8, wherein the communication system comprises a multi-carrier communication system.

12. The method according to claim 8, wherein each communication link is chosen from a group consisting of coaxial cable, twisted pair wire, and flat pair wire.

13. The method according to claim 8, wherein one or more communication links have different length.

14. The method according to claims 8, further comprising:
computing a power increase available for use by each remote unit.

15. The method according to claim 8, further comprising:
establishing for said reducing and said increasing at least one of:
a minimum signal quality for a data connection;
a maximum range of signal quality across data connections;
a data connection to be exclude from said adjusting and said increasing; and
a maximum transmission level to which the transmission power level is increased.

16. A method for monitoring the performance of a plurality of communication links, each of the plurality of communication links coupling a respective remote unit to a central unit, said method comprising:
measuring a set of parameters associated with each of the plurality of communication links;
selecting a remote unit from among the plurality of remote units based on said measuring;
adjusting a transmission power level of the selected remote unit to converge the set of parameters for all of the plurality of the communication links, said selectively adjusting reducing interference between the communication links; and
increasing a corresponding transmission power level for each of the plurality of remote units based on said adjusting, wherein said increasing maintains the convergence of the set of parameters.

17. The method according to claim 16, wherein said increasing comprises:
increasing the corresponding transmission power level for each remote unit up to a selected maximum transmission power level.

18. The method according to claim 16, wherein the set of parameters comprises:
a Signal to Noise Ratio (SNR).

19. The method according to claim 16, further comprising:
computing a power increase available for use by each remote unit.

20. The method according to claim 16, further comprising:
establishing for said reducing and said increasing at least one of:
a minimum signal quality for a data connection;
a maximum range of signal quality across data connections;
a data connection to be exclude from said adjusting and said increasing; and
a maximum transmission level to which the transmission power level is increased.

21. A central unit communicating with a plurality of remote units through a plurality of communication links, the central unit comprising:
a transceiver adapted to receive a respective signal quality level for each of the plurality of communication links and to send an adjustment signal to a remote unit having the highest received signal quality level among the plurality of remote units; and
a processor coupled to said transceiver adapted to compute the adjustment signal based on the received signal quality levels, wherein the adjustment signal is calculated such that interference among the plurality of communication links is reduced,
wherein said processor reduces the transmission power level of the remote unit having the highest received signal quality level so as to increase the received signal quality levels of the remaining remote units of the plurality of remote units, and
wherein said processor further increases the transmission power level of each of the plurality of remote units based on said reduction.

22. The central unit according to claim 21, wherein the adjustment signal is calculated so as to converge the received signal quality levels towards a mean received signal quality level for all of the plurality of communication links.

23. The central unit according to claim 21, wherein said transceiver balances transmission power levels of the plurality of remote units so as to maintain a normalized signal quality level for all of the plurality of communication links.

24. The central unit according to claim 21, wherein said processor further computes a power increase available for use by each remote unit.

25. The central unit according to claim 21, further comprising:
a memory containing information of at least one of:
a minimum signal quality for a data connection;
a maximum range of signal quality across data connections;
a data connection to be exclude from said adjusting and said increasing; and
a maximum transmission level to which the transmission power level is increased.

26. An apparatus for optimizing performance of multiple communication links coupling a plurality of remote units to a central unit, said apparatus comprising:
means for measuring a plurality of received signal quality levels received at the central unit for each of the plurality of communication links;
means for reducing a transmission power level of a remote unit having the highest received signal quality level among the plurality of remote units so as to reduce-interference among the plurality of communication links; and
means for increasing the transmission power level of the plurality of remote units based on said reducing, said increasing maintaining a normalized signal quality level for all of the plurality of communication links.

27. The apparatus according to claim 26, wherein said means for adjusting comprises:
means for converging the plurality of received signal quality levels within a selected range for all communication links.

28. The apparatus according to claim 27, wherein said means for adjusting further comprises:
 means for selecting the remote unit having the highest received signal quality level based on the measurement.

29. The apparatus according to claim 26, wherein said means for increasing comprises:
 means for increasing the corresponding transmission power level for each of the plurality of remote units up to a selected maximum transmission power level.

30. A program storage device readable by a machine, tangibly embodying a program of instructions readable by the machine to perform a method for increasing performance of multiple communication links, the method comprising:
 measuring a received signal quality level for each of a plurality of communication links at a central unit, each of the plurality of communication links coupling the central unit to a respective remote unit;
 reducing a transmission power level of the remote unit having the highest received signal quality level among the plurality of remote units; and
 increasing the transmission power level of the plurality of remote units based on said reducing.

31. The program storage device according to claim 30, wherein said method further comprises:
 converging the received signal quality levels within a selected range for all of the plurality of communication links based on said adjusting.

32. The program storage device according to claim 31, wherein said:
 reducing increases the received signal quality levels of the remaining remote units, and wherein said increasing maintains a normalized signal quality level for all of the plurality of communication links.

33. The program storage device according to claim 30, wherein said increasing comprises:
 increasing the transmission power level for each remote unit up to a selected maximum transmission power level.

34. A method for optimizing the performance of multiple communication links, comprising:
 measuring a received signal quality level for each of a plurality of communication links at a central unit, each of the plurality of communication links coupling the central unit to a respective remote unit;
 reducing the received signal quality levels of the plurality of communication links by reducing a transmission power level of the remote unit having the highest received signal quality level among the plurality of remote units so as to increase the received signal quality levels of remaining remote units of the plurality of remote units; and
 increasing the transmission power level of each of the plurality of the remote units based on said reducing.

35. The method in accordance with claim 34, wherein said increasing comprises:
 computing available power increase for each of the plurality of remote units.

36. The method in accordance with claim 34, further comprising:
 iteratively repeating said measuring and said adjusting until the received signal quality levels converge within a selected range.

37. The method according to claim 34, further comprising:
 determining, after said reducing, whether a new received signal quality level of each of the remote units is within a specified range.

38. The method according to claim 34, further comprising:
 establishing for said reducing and said increasing at least one of:
 a minimum signal quality for a data connection;
 a maximum range of signal quality across data connections;
 a data connection to be exclude from said reducing and said increasing; and
 a maximum transmission level to which the transmission power level is increased.

39. A program storage device readable by a machine, tangibly embodying a program of instructions executable by the machine to perform a method for monitoring the performance of a plurality of communication links, each of the plurality of communication links coupling a respective remote unit to a central unit, said method comprising:
 measuring a set of parameters associated with each of the plurality of communication links;
 selecting a remote unit from among the plurality of remote units based on said measuring;
 adjusting a transmission power level of the selected remote unit to converge the set of parameters for all of the plurality of the communication links, wherein said selectively adjusting reduces interference between the communication links; and
 increasing a corresponding transmission power level for each of the plurality of remote units based on said adjusting, wherein said increasing maintains the convergence of the set of parameters.

40. The program storage device according to claim 39, wherein said increasing comprises:
 increasing the transmission power level for each remote unit up to a selected maximum transmission power level.

41. The program storage device according to claim 39, wherein the set of parameters comprises:
 a Signal to Noise Ratio (SNR).

42. A program storage device readable by a machine, tangibly embodying a program of instructions executable by the machine to perform a method for optimizing the performance of multiple communication links, said method comprising:
 measuring a received signal quality level for each of a plurality of communication links at a central unit, each of the plurality of communication links coupling the central unit to a respective remote unit;
 reducing the received signal quality levels of the plurality of communication links by reducing a transmission power level of the remote unit having the highest received signal quality level among the plurality of remote units so as to increase the received signal quality levels of remaining remote units of the plurality of remote units; and
 increasing the transmission power level of each of the plurality of the remote units based on said reducing.

43. The program storage device in accordance with claim 42, wherein said increasing comprises:
 computing available power increase for each of the plurality of remote units.

44. The program storage device in accordance with claim 42, wherein said method further comprises:
 iteratively repeating said measuring and said adjusting until the received signal quality levels converge within a selected range.

45. An apparatus for monitoring the performance of a plurality of communication links, each of the plurality of communication links coupling a respective remote unit to a central unit, said apparatus comprising:

means for measuring a set of parameters associated with each of the plurality of communication links and selecting a remote unit from among the plurality of remote units based on said measuring;

means for adjusting a transmission power level of the selected remote unit to converge the set of parameters for all of the plurality of the communication links, wherein said selectively adjusting reduces interference between the communication links; and means for increasing a corresponding transmission power level for each of the plurality of remote units based on the adjustment by said means for adjusting, wherein said means for increasing maintains the convergence of the set of parameters.

46. The apparatus according to claim 45, wherein said means for increasing increases the corresponding transmission power level for each remote unit up to a selected maximum transmission power level.

47. The apparatus according to claim 45, wherein the set of parameters comprises:

a Signal to Noise Ratio (SNR).

48. An apparatus for optimizing the performance of multiple communication links, said apparatus comprising:

means for measuring a received signal quality level for each of a plurality of communication links at a central unit, each of the plurality of communication links coupling the central unit to a respective remote unit;

means for reducing a transmission power level of the remote unit having the highest received signal quality level among the plurality of remote units so as to increase the received signal quality levels of remaining remote units of the plurality of remote units; and means for increasing the transmission power level of each of the plurality of the remote units based on said reducing.

49. The apparatus in accordance with claim 48, wherein said means for increasing comprises:

means for computing available power increase for each of the plurality of remote units.

50. The apparatus in accordance with claim 48, said means for adjusting further comprises:

means for iteratively repeating operation of said means for measuring and said means for adjusting until the received signal quality levels converge within a selected range.

* * * * *